Figure 1:
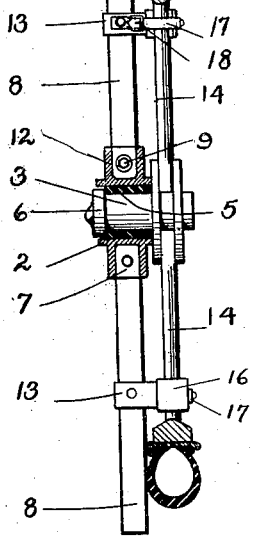

E. E. POTTER.
VEHICLE WHEEL ATTACHMENT.
APPLICATION FILED OCT. 21, 1911.

1,043,250.

Patented Nov. 5, 1912.

WITNESSES:

INVENTOR
EDWARD E. POTTER.
BY
Miller & White
HIS ATTORNEYS.

UNITED STATES PATENT OFFICE.

EDWARD E. POTTER, OF SAN FRANCISCO, CALIFORNIA.

VEHICLE WHEEL ATTACHMENT.

1,043,250.

Specification of Letters Patent. Patented Nov. 5, 1912.

Application filed October 21, 1911. Serial No. 655,842.

*To all whom it may concern:*

Be it known that I, EDWARD E. POTTER, a citizen of the United States, and a resident of the city and county of San Francisco and State of California, have invented certain new and useful Improvements in Vehicle Wheel Attachments, of which the following is a specification.

The invention relates to a device adapted to be attached to the driving wheels of power driven vehicles.

The object of the invention is to provide an attachment for the driving wheels of an automobile which will give the wheel a grip on the road when the vehicle is passing through sand, mud or loose earth.

Another object of the invention is to provide an attachment of the class described which may be rapidly attached and detached from the wheel, and which when detached is foldable so that it occupies a small space.

When an automobile is driven in sand, the driving wheels cannot obtain a grip and the rotation of the wheel only causes it to sink deeper into the sand. In this condition the wheel has no tractive effect and it is often necessary to resort to other sources of power to pull the vehicle out of the sand. The device of my invention attaches to the wheel and obtains a grip on the sand, so that the vehicle may be driven by its own power.

The device possesses other advantageous features, which, with the foregoing will be set forth at length in the following description, where I shall outline in full that form of the invention which I have selected for illustration in the drawings accompanying and forming part of the present specification. The novelty of the invention will be included in the claim succeeding said description. From this it will be apparent that I do not limit myself to the showing made by such drawings and descriptions as I may adopt many variations within the scope of my invention as expressed in said claim.

Figure 2:
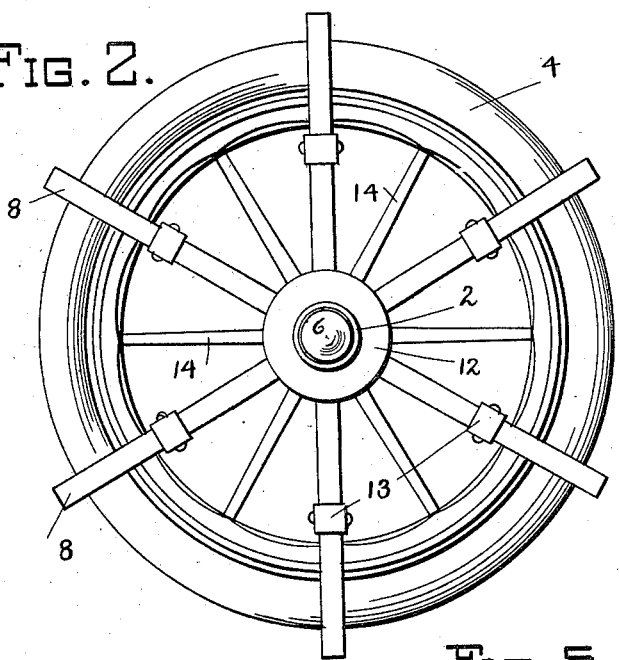
Figure 3:
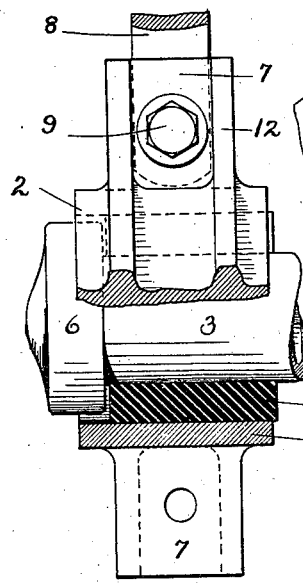
Figure 4:
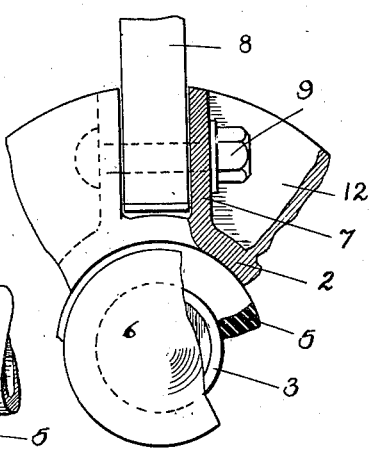
Figure 5:
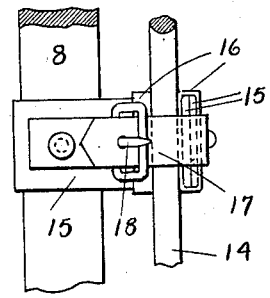
Figure 6:
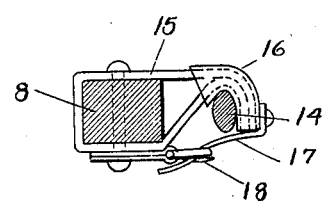

Referring to the drawings:—Figure 1 is a cross section through an automobile wheel showing the device of my invention attached thereto. Fig. 2 is a side view of a wheel with the device attached thereto. Fig. 3 is a side view of the hub of my attachment, showing the means of supporting it on the hub of the wheel. Fig. 4 is a detail showing the construction of the hub of the attachment. Fig. 5 is a detail showing in elevation the method of securing the attachment to the wheel spoke. Fig. 6 is a cross section through the spoke and an arm of the attachment showing the attaching means.

For the sake of description and to avoid ambiguity in the specification, the attachment will be hereinafter referred to as a
tractor. The tractor comprises a hub 2 adapted to engage the hub 3 of the vehicle wheel 4 to which the tractor is attached. Within the hub 2 is preferably arranged a cylindrical cushion 5 formed of rubber so that the vehicle hub will not become marred and disfigured. When the cap 6 of the hub 3 is of larger diameter than the hub it is necessary to remove the cap before the tractor can be placed in position.

The hub 2 is preferably formed with lugs or flanges 7 arranged transversely thereon, the lugs being arranged in pairs, forming a seat between them for the arms 8. The arms are pivotally attached to the lugs by the bolts 9, so that they may be folded when the tractor is removed from the wheel. The hub is preferably formed with the integral circumferential plate 12, forming a stiffening member for the lugs.

In practice I have generally found six arms 8 to be most convenient, but the number may be varied if desired. The arms extend from the hub 2 radially and are of such length that they project beyond the edge of the wheel or tire. The tractor is held on the wheel by means of the attaching members 13 on the arms 8 which engage the spokes 14 of the wheel. The attaching member consists preferably of a band or strip of metal 15 secured to the arm 8 and bent into the form of a hook adapted to engage the spoke 14. This hook is preferably covered with a soft material 16 such as rubber, so that the spokes will not become scratched or marred. As the tractive effort is always in one direction as the vehicle is moving forward the spoke is being continually pressed into the hook and there is small liability of disengagement. In order to insure attachment the spoke is confined in the hook by the strap 17 engaging the buckle 18. The tractor may be readily attached and detached from the wheel in a short time and when attached it gives a positive tractive effect when the vehicle is running in sand.

As the wheel rotates the arms 8 successively engage the sand and drive the vehicle along the road.

I claim:

An attachment for vehicle wheels comprising a hub adapted to engage the wheel hub, a plurality of radially disposed arms pivotally attached to said hub and being of such length that they project beyond the periphery of the wheel and means for attaching said arms to the wheel spokes.

In testimony whereof, I have hereunto set my hand at San Francisco, California, this 16th day of October 1911.

EDWARD E. POTTER.

In presence of—
  H. G. Prost,
  P. S. Pidwell.